(12) United States Patent
Kim et al.

(10) Patent No.: US 8,830,142 B1
(45) Date of Patent: Sep. 9, 2014

(54) HEAD-MOUNTED DISPLAY AND METHOD OF CONTROLLING THE SAME

(71) Applicant: LG Electronics Inc., Seoul (KR)

(72) Inventors: Jihwan Kim, Seoul (KR); Jongho Kim, Seoul (KR); Sinae Chun, Seoul (KR); Eunhyung Cho, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/161,438

(22) Filed: Jan. 22, 2014

(30) Foreign Application Priority Data

Sep. 26, 2013 (KR) ........................ 10-2013-0114534

(51) Int. Cl.
*G09G 5/00* (2006.01)
*H04N 5/222* (2006.01)
*G02B 27/01* (2006.01)

(52) U.S. Cl.
CPC .................................... *G02B 27/017* (2013.01)
USPC .......................................... 345/8; 348/333.07

(58) Field of Classification Search
CPC ............. G02B 27/017; G02B 27/0172; G02B 2027/0138
USPC .............................. 345/8; 348/333.01–333.13
See application file for complete search history.

(56) References Cited

U.S. PATENT DOCUMENTS

| 6,560,029 | B1 | 5/2003 | Dobbie et al. | |
|---|---|---|---|---|
| 7,612,821 | B1 * | 11/2009 | Hsia | 348/333.01 |
| 2004/0189850 | A1 * | 9/2004 | Chang | 348/333.07 |
| 2006/0055786 | A1 * | 3/2006 | Ollila | 348/207.99 |
| 2006/0153409 | A1 | 7/2006 | Yeh | |
| 2010/0208121 | A1 * | 8/2010 | Kato et al. | 348/333.07 |
| 2012/0212593 | A1 | 8/2012 | Na'aman et al. | |
| 2013/0002559 | A1 | 1/2013 | Vardi | |

FOREIGN PATENT DOCUMENTS

| JP | 2000-152066 A | 5/2000 |
|---|---|---|
| JP | 2009-206584 A | 9/2009 |
| WO | WO 2013/049248 A2 | 4/2013 |

* cited by examiner

*Primary Examiner* — Sumati Lefkowitz
*Assistant Examiner* — David Tung
(74) *Attorney, Agent, or Firm* — Birch, Stewart, Kolasch & Birch, LLP

(57) ABSTRACT

Disclosed herein are a head-mounted display and a method of controlling the same, more particularly, a method of providing a first content or second content to a display unit according to detachment or mounting of a camera from or to the head-mounted display.

14 Claims, 11 Drawing Sheets

(a)

(b)

(a)

(b)

(a)

(b)

HEAD-MOUNTED DISPLAY AND METHOD OF CONTROLLING THE SAME

Pursuant to 35 U.S.C. §119(a), this application claims the benefit of Korean Patent Application No. 10-2013-0114534, filed on Sep. 26, 2013, which is hereby incorporated by reference as if fully set forth herein.

BACKGROUND OF THE INVENTION

1. Field of the Invention

This specification relates to a head-mounted display and a method of controlling the same, and more particularly, to a method of providing a first content or second content to a display unit according to detachment or mounting of a camera from or to the head-mounted display.

2. Discussion of the Related Art

Head-mounted displays (HMDs) refer to various types of digital devices worn on the head like glasses to receive provided multimedia content. According to the current trend of light-weight and compact design of digital devices, various wearable computers are under development, and HMDs are also widely used. HMDs may provide a variety of conveniences to users beyond a simple function of display by being combined with the augmented reality technology and the N-Screen technology.

For example, in the case that an HMD is equipped with a microphone and a speaker, a user can make a phone call, wearing the HMD. In addition, in the case that the HMD is equipped with a camera, the user can capture an image of an object in a desired direction, wearing the HMD.

SUMMARY OF THE INVENTION

Accordingly, this specification is directed to a head-mounted display and a method of controlling the same that substantially obviate one or more problems due to limitations and disadvantages of the related art.

An object of this specification is to display different content on the display unit depending upon whether or not a camera is mounted, by recognizing mounting or detachment of the camera to or from a head-mounted display (HMD).

Another object of this specification is to display different content on the display unit depending upon whether or not the camera is activated in the case that the camera detached from the HMD is re-mounted.

Another object of this specification is to provide a mounting interface to guide mounting of a camera to the HMD by recognizing re-mounting of the camera detached from the HMD.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a head-mounted display (HMD) includes a first body and a second body, wherein the first body includes a display unit configured to display visual information, a first communication unit configured to transmit/receive data, and a processor configured to control the display unit, a sensor unit, a camera unit, the first communication unit, and a second communication unit, and the second body includes a camera unit configured to sense an image, the second communication unit configured to transmit/receive data, and a sensor unit configured to detect an input signal and transmit a result of the detection to the processor, wherein the second body is detachable from and mountable to the first body, wherein the processor is further configured to display a first content when the second body is mounted to the first body, detect a signal when the second body is detached from the first body, and display a second content in response to the detected signal indicating detachment of the second body, wherein the second content corresponds to an image preview interface of an image sensed through the camera unit included in the detached second body.

In another aspect of the present invention, a method of controlling a head-mounted display including a first body and a second body, includes the steps of displaying a first content when the second body is mounted to the first body, wherein the second body being mountable to and detachable from the first body, and displaying a second content when the second body is detached from the first body, wherein the second content corresponding to an image preview interface of an image sensed through a camera unit included in the detached second body.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Although the terms used in this specification are selected, as much as possible, from general terms that are widely used at present while taking into consideration of the functions obtained in accordance with one embodiment, these terms may be replaced by other terms based on intensions of those skilled in the art, customs, emergence of new technologies, or the like. Also, in a particular case, terms that are arbitrarily selected by the applicant may be used. In this case, meanings of these terms may be disclosed in corresponding description parts of the invention. Accordingly, it should be noted that the terms used herein should be construed based on practical meanings thereof and the whole content of this specification, rather than being simply construed based on names of the terms.

Embodiments will now be described in detail with reference to the accompanying drawings and the content disclosed therein. However, this specification is not limited to or constrained by the embodiments. Wherever possible, the same reference numbers will be used throughout the drawings to refer to the same or like parts.

Figure 1:
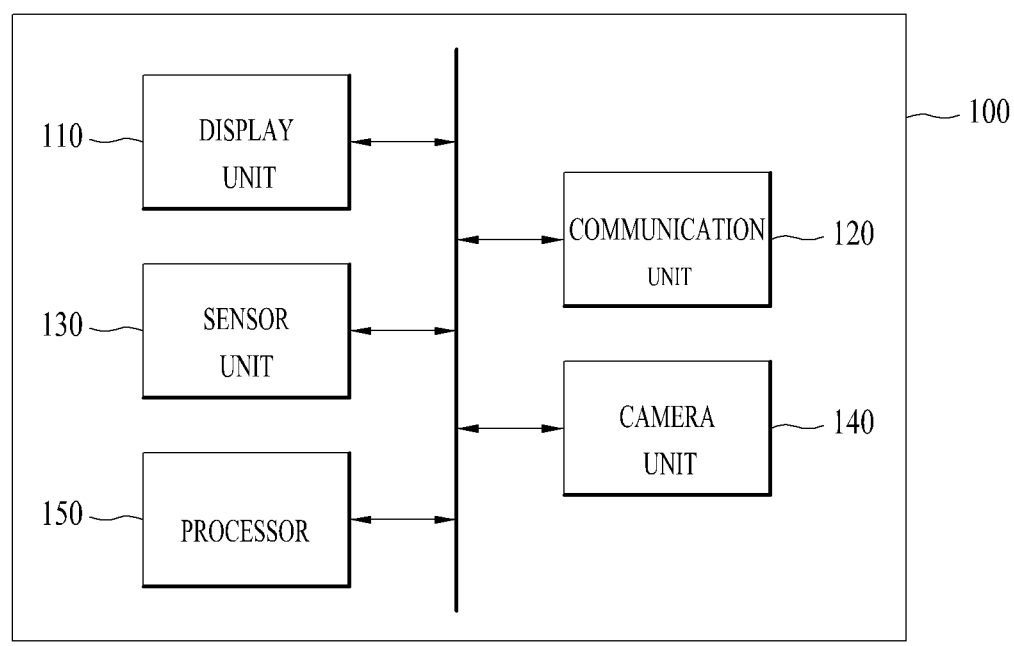
FIG. 1 is a block diagram illustrating a head-mounted display (HMD) disclosed in this specification.

FIG. 1 is a block diagram illustrating a head-mounted display (HMD) disclosed in this specification. In FIG. 1 illustrating one embodiment, some constituent modules may be omitted, or new constituent modules may be added, as desired by a person skilled in the art.

As shown in FIG. 1, the HMD 100 according to one embodiment may include a display unit 110, a communication unit 120, a sensor unit 130, a camera unit 140 and a processor 150.

The HMD 100 may include a first body and a second body. The first body, which serves as a main body of the HMD 100, may include the display unit 110, a first communication unit, and the processor 150. The second body, which is detachable from the main body of the HMD 100, may include the camera unit 140, a second communication unit, and the sensor unit 130. The aforementioned first body and second body are one embodiment, and some constituent units of the first body and second body may be changed or new constituent units may be added to the first body and second body, as desired by a person skilled in the art.

The display unit 110 may display visual information. Herein, the visual information may include content, an application, an image, and a video. In addition, the display unit 110 may output the visual information to the screen based on a control command from the processor 150. In this specification, the display unit 110 may be included in the first body of the HMD 100.

In this specification, the HMD 100 may output an image to the display screen in various techniques. In one embodiment, the HMD 100 may output an image with a see-through technique. Herein, the see-through technique, which employs a transparent display screen, represents a technique allowing a user wearing the HMD 100 to use content while recognizing the surrounding environment. In another embodiment, the HMD 100 may output an image with a front-light technique. Herein, the front-light technique represents a technique of displaying a reflected image using a reflector such as a mirror without directly projecting light into eyes.

Also, in another embodiment, the HMD 100 may output an image with a see-closed technique. Herein, the see-closed technique represents a technique of using content through the display screen while an external environment is not visible through the display screen. In this specification, the HMD 100 is assumed to display an image using the see-through or front-light technique.

The communication unit 120 may communicate with an external device and transmit/receive data using various protocols. In addition, the communication unit 120 may access a network in a wired or wireless manner to transmit/receive digital data such as content. For example, the communication unit may use communication standards such as wireless LAN (WLAN or Wi-Fi), wireless broadband (Wibro), world interoperability for microwave access (Wimax), and high speed downlink packet access (HSDPA) to access a wireless network.

In this specification, the communication unit 120 may include a first communication unit and a second communication unit. As described above, the first communication unit may be provided to the first body, and the second communication unit may be provided to the second body. In addition, the first communication and second communication units may transmit/receive a signal to/from the processor 150 included in the first body, and may transmit/receive a signal to/from the camera unit 140 included in the second body.

The sensor unit 130 may sense a surrounding environment of the HMD 100 using at least one sensor mounted to the HMD 100, and deliver a signal for the same to the processor 150.

The sensor unit 130 may include at least one sensing means. According to one embodiment, the at least one sensing means may include a gravity sensor, a terrestrial magnetism sensor, a motion sensor, a gyroscope sensor, a acceleration sensor, an infrared sensor, an inclination sensor, an illuminance sensor, an altitude sensor, an olfactory sensor, a temperature sensor, a depth sensor, a pressure sensor, a bending sensor, an audio sensor, a video sensor, a global positioning system (GPS) sensor, a touch sensor and a grip sensor.

In addition, the sensor unit 130, which a general term for the various sensing means described above, may sense various inputs from the user and the environment of the HMD 100 and deliver a result of sensing to the processor 150 such that the processor 150 can perform an operation corresponding to the sensed inputs and environment. The aforementioned sensors may be included in the HMD 100 as separate elements or by being integrated into at least one element.

In this specification, the sensor unit 130 may be provided to the first body. In this specification, the sensor unit 130 may be provided not only to the first body but also to the second body. In addition, the sensor unit 130 may acquire an image capturing signal from the user. In addition, the sensor unit 130 may detect a signal when the second body is detached from the first body and a signal for mounting of the second body to the first body.

The camera unit 140 may capture an image. More specifically, the camera unit 140 may capture an image of an object in the front. Herein, the front may correspond to the direction in which the camera unit 140 faces. In addition, the camera unit 140 may sense an image within the range of view angle, and provide the same to the processor 150. Herein, the range of view angle refers to the range of horizontal and vertical viewing angles that may be covered by the screen in sensing an image.

In this specification, the camera unit 140 may be included in the second body. In this specification, the camera unit 140 may be provided not only to the second body but also to the first body. The camera unit 140 included in the second body may sense an image while being mounted to the first body. In addition, the camera unit 140 included in the second body may sense an image while being detached from the first body. In addition, the camera unit 140 may transmit an image sensed by a mounting interface to guide the second body in mounting the second body to the first body.

The processor 150 may process data, control the respective units of the HMD 100 described above, and control transmission/reception of data between the units. In this specification, the processor 150 may be included in the first body. The processor 150 may be separately provided to the second body in addition to the first body.

In this specification, in the case that the second body is mounted to the first body, the processor 150 may display a first content. In addition, the processor 150 may detect a signal when the second body is detached from the first body. In response to the detected signal when the second body is detached, the processor 150 may display a second content. For example, the second content may correspond to an image preview interface of an image sensed through the camera unit 140 included in the detached second body. Other operations of the processor 150 will be described in detail with reference to FIGS. 3 to 9.

According to one embodiment of this specification, the operations performed by the HMD 100 may be controlled the processor 150. In the following descriptions and drawings, theses operations will commonly described as being performed/controlled by the HMD 100, for ease of description.

Although not shown in FIG. 1, the HMD 100 may include a power unit, storage unit, audio unit. The power unit is a power source connected to the internal battery of the HMD 100 or an external power source. The power unit may supply power to the HMD 100. In addition, the storage unit may store various digital data including audio data, photos, videos and applications. The storage unit may represent various digital data storage spaces including a flash memory, a random access memory (RAM), and a solid state drive (SSD). In addition, the audio unit may output receive or output audio data through the microphone and the speaker.

FIG. 1 is a block diagram of the HMD 100 according to one embodiment. The individually indicated blocks show elements of the HMD 100 which are logically distinguished from each other. Accordingly, the illustrated elements of the HMD 100 may be mounted to one chip or a plurality of chips according to the design of the device.

Figure 2:
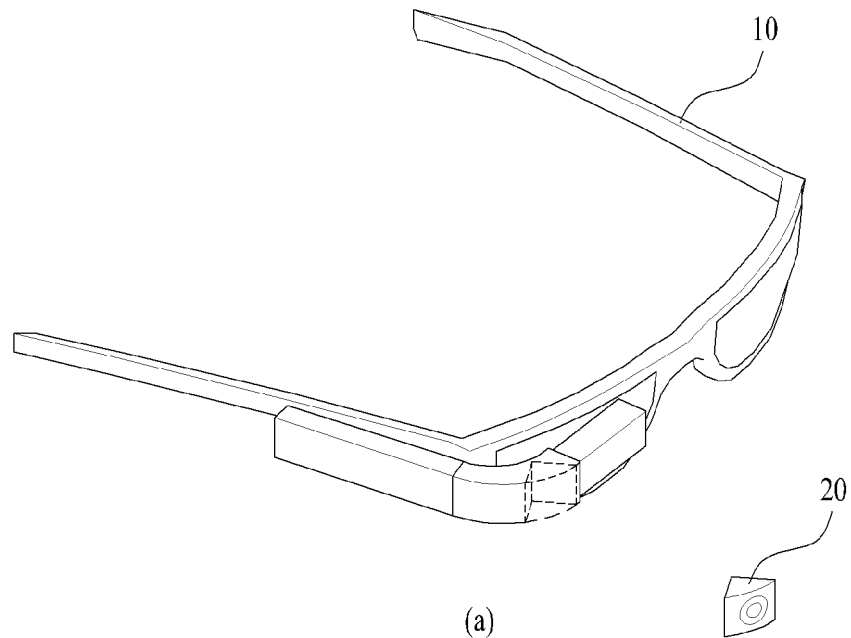
FIG. 2 is a view illustrating an embodiment of the HMD of this specification.
Figure 2:
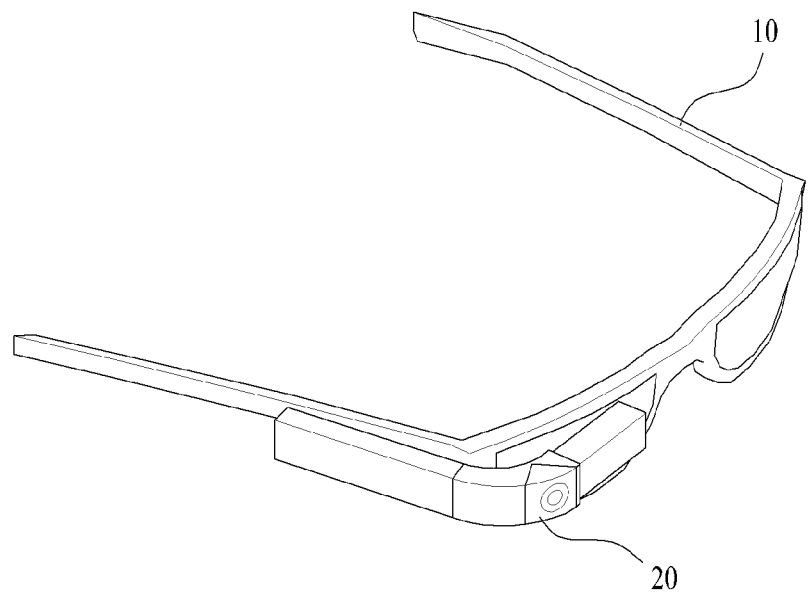

FIG. 2 is a view illustrating an embodiment of the HMD of this specification. More specifically, FIG. 2(*a*) illustrates the HMD 100 with the second body 20 detached from the first body 10. FIG. 2(*b*) illustrates the HMD 100 with the second body 20 mounted to the first body.

As described above with reference to FIG. 1, the HMD 100 may include the first body 10 and the second body 20. In addition, the first body 10 may correspond to the main body of the HMD 100, and the second body 20 may correspond to a sub-body of the HMD 100.

In this specification, the first body 10 may be provided with a display unit, a first communication unit, and a processor. The first body 10 may be additionally provided with a sensor unit and a camera unit. In this specification, the second body 20 may be provided with a camera unit, a second communication unit, and a sensor unit. The second body 20 may be additionally provided with a processor operating independently of the processor of the first body 10.

In addition, as shown in FIG. 2, the second body 20 may be detached from and mounted to the first body 10. For example, a portion of the first body 10 or the second body 20 that is detached and mounted may be provided with a magnetic part to allow the second body 20 to be detached from and mounted to the first body. In addition, a portion of the first body 10 or the second body 20 that is detached and mounted may be configured with a connection structure to facilitate detachment and mounting.

Figure 3:
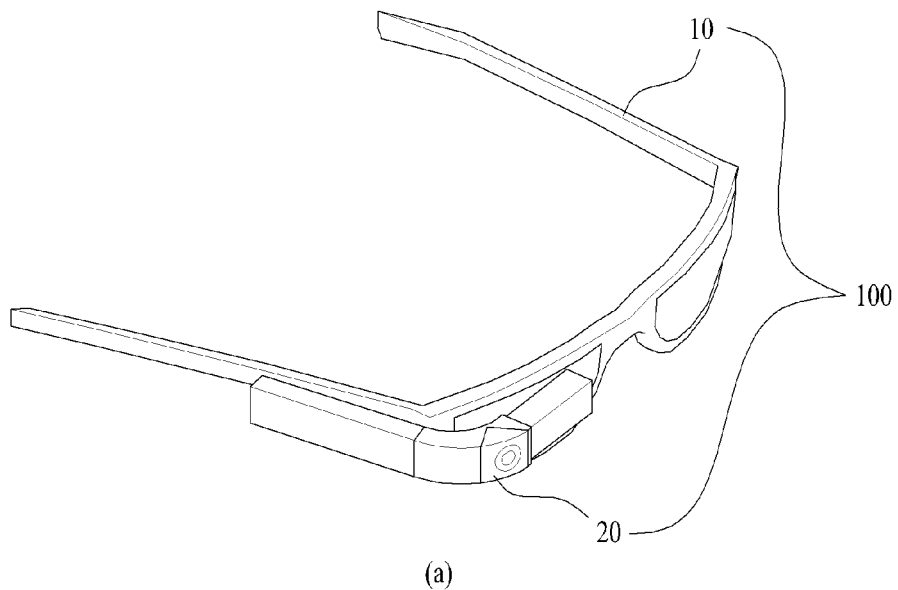
FIG. 3 is a view illustrating a first embodiment of a method of controlling the HMD of this specification.
Figure 3:
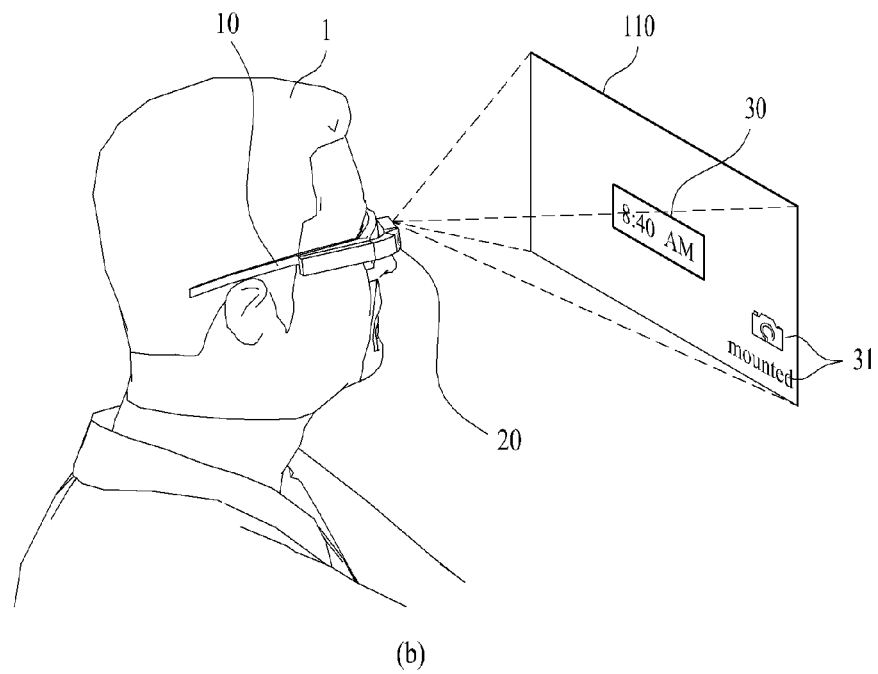

FIG. 3 is a view illustrating a first embodiment of a method of controlling the HMD of this specification. More specifically, FIG. 3(*a*) illustrates the HMD 100 with the second body 20 mounted to the first body 10. FIG. 3(*b*) illustrates content displayed on the display unit 110 of the HMD 100.

As shown in FIG. 3(*a*), the HMD 100 may detect mounting of the second body 20 to the first body 10. More specifically, the HMD 100 may detect a signal for mounting of the second body 20 to the first body 10. In addition, the mounting signal corresponds to a signal indicating that the second body 20 has been mounted to the first body 10. For example, the mounting signal may be detected when the second body 20 is completely mounted to the first body 10, may not be detected when the second body 20 is incompletely mounted to the first body 10. Herein, the mounting signal may be detected by means of the sensor unit provided to the first body 10 or the second body 20 and then delivered to the processor.

As shown in FIG. 3(*b*), in the case that the second body 20 is mounted to the first body 10, the HMD 100 may display the first content 30. Herein, the first content may correspond to the home screen or content which is currently in use. That is, the first content may be content which is available to the user while the camera unit of the HMD 100 is not activated. For example, in the case that the second body 20 is mounted to the first body 10, and a social network service (SNS), for example, Facebook, is being used, the HMD 100 may display Facebook on the display unit 110. In addition, as shown in FIG. 3(*b*), in the case that the home screen is set to display the current time, and the second body 20 is mounted to the first body 10, the HMD 100 may display the current time on the display unit 110. In addition, the first content may correspond to weather, calendar, etc.

Meanwhile, in the case that the second body 20 is mounted to the first body 10, the HMD 100 may display a mounted-mode indicator 31. More specifically, in the case that the second body 20 is accurately mounted to the first body 10, the HMD 100 may display the mounted-mode indicator 31. The mounted-mode indicator 31, which functions to indicate that the second body 20 is mounted to the first body 10, may be displayed in various forms or ways. For example, as shown in FIG. 3(*b*), the HMD 100 may display a 'camera' icon and a 'mounted' icon as the mounted-mode indicator 31. Although not shown in FIG. 3, the HMD 100 may provide, for example, an audio effect as the mounted-mode indicator 31, in addition to the icons. Thereby, the user 1 may readily recognize whether the second body 20 has been mounted to the first body 10.

Meanwhile, although not shown in FIG. 3, the HMD 100 may detect a capturing signal with the second body 20 mounted to the first body 10. Herein, the capturing signal may include a touch signal or a voice signal for the first body 10 or the second body 20. It will be herein assumed that the camera unit provided to the second body 20 is in the activated mode. In response to the detected capturing signal, the HMD 100 may capture an image within the view angle of the camera unit included in the second body 20. In this case, the image preview interface is not displayed on the display unit 110, and the user 1 cannot confirm the captured image. The image of an object in the direction in which the user 1 wearing the HMD 100 faces is captured.

Figure 4:
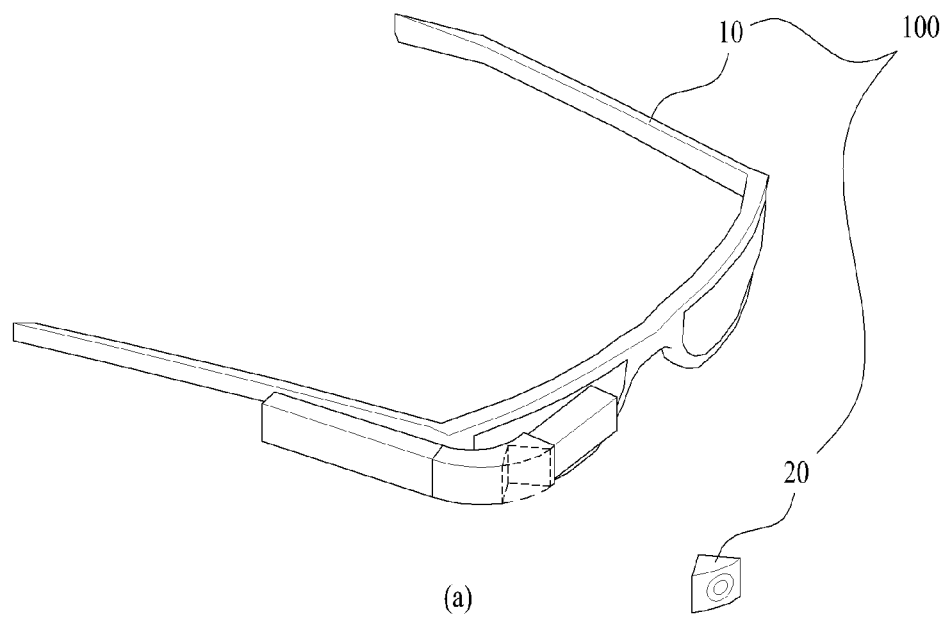
FIG. 4 is a view illustrating a second embodiment of a method of controlling the HMD of this specification.
Figure 4:
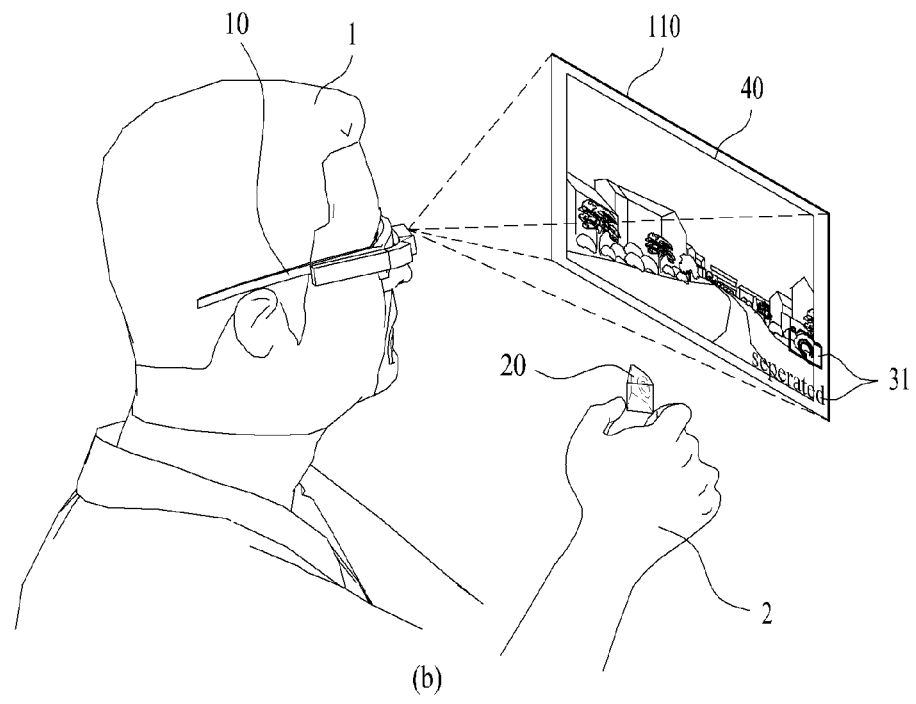

FIG. 4 is a view illustrating a second embodiment of a method of controlling the HMD of this specification. More specifically, FIG. 4(*a*) illustrates the HMD 100 with the second body 20 detached from the first body 10. FIG. 4(*b*) illustrates content displayed on the display unit 110 of the HMD 100.

As shown in FIG. 4(*a*), the HMD 100 may detect when the second body 20 is detached from the first body 10. More specifically, the HMD 100 may detect a signal for detachment of the second body 20 from the first body 10. The detachment signal corresponds to a signal indicating that the second body 20 has been detached from the first body 10. For example, the detachment signal may be detected when the second body 20 is completely detached from the first body 10, and may not be detected when the second body 20 is not completely detached from the first body 10. Herein, the detachment signal may be detected by means of the sensor unit provided to the first body 10 or the second body 20, and then delivered to the processor.

In addition, as shown in FIG. 4(b), in the case that the second body 20 is detached from the first body 10, the HMD 100 may display the second content 40. Herein, the second content 40 may correspond to an image preview interface of an image sensed through the camera unit included in the detached second body 20. That is, in capturing an image through the camera unit, the second content 40 corresponds to an image preview interface that provides the user 1 with an image sensed prior to capturing the image. In the case that the second body 20 is detached from the first body 10, the camera unit included in the second body 20 may be freely moved according to movement of a hand 2 of the user 1. Thereby, images in various areas within the view angle may be sensed.

In addition, the HMD 100 may display the image preview interface on the display unit 110 in various ways. For example, as shown in FIG. 4(b), the HMD 100 may display the image preview interface on the display unit 110 such that the image preview interface occupies about 90% of the display unit 110. In addition, although not shown in FIG. 4, the HMD 100 may display, for example, the image preview interface at one of the upper, lower, left and right sides of the display unit 110. In this case, the HMD 100 may display the image preview interface and other content on the display unit 110.

Meanwhile, in the case that the second body 20 is detached from the first body 10, the HMD 100 may display a detached-mode indicator 41. More specifically, in the case that the second body 20 is completely detached from the first body 10, the HMD 100 may display the detached-mode indicator 41. The detached-mode indicator 41, which functions to indicate that the second body 20 has been detached from the first body 10, may be displayed in various forms or ways. For example, as shown in FIG. 4(b), the HMD 100 may display a 'camera' icon and a 'separated' icon as the detached-mode indicator 41. In addition, although not shown in FIG. 4, the HMD 100 may also provide, for example, an audio effect as the detached-mode indicator 41. Thereby, the user 1 may readily recognize detachment of the second body 20 from the first body 10.

Meanwhile, although not shown in FIG. 4, the HMD 100 may detect a capturing signal with the second body 20 detached from the first body 10. Herein, the capturing signal may include a signal for touch of the second body 20 by the user 1 or a signal for the voice of the user 1. In response to the detected capturing signal, the HMD 100 may capture an image displayed on the image preview interface 40. In this case, the user 1 can predict an image to be captured since the image preview interface 40 is displayed on the display unit 110.

Figure 5A:
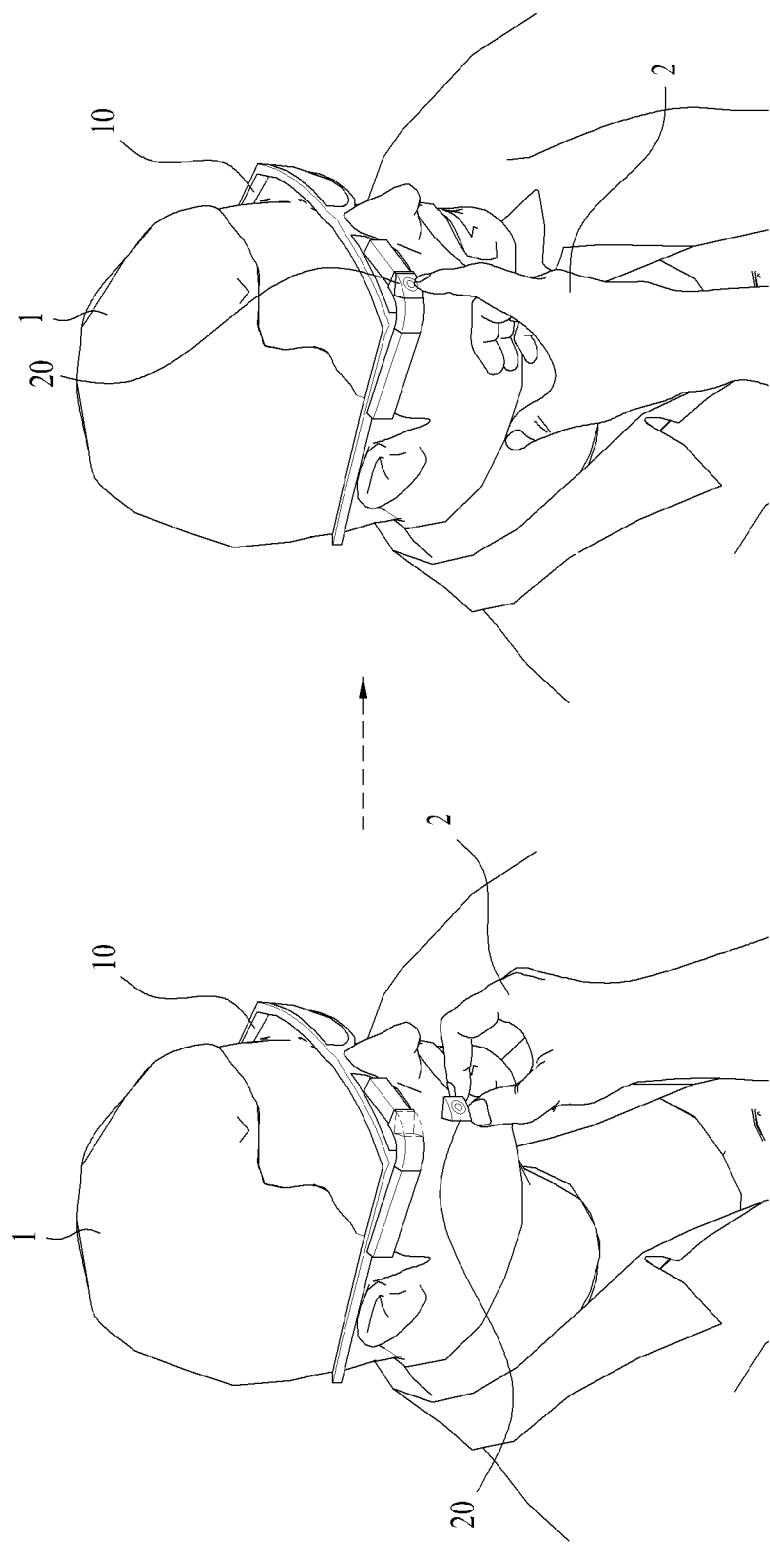
FIGS. 5a and 5b are views illustrating a third embodiment of a method of controlling the HMD of this specification.
Figure 5B:
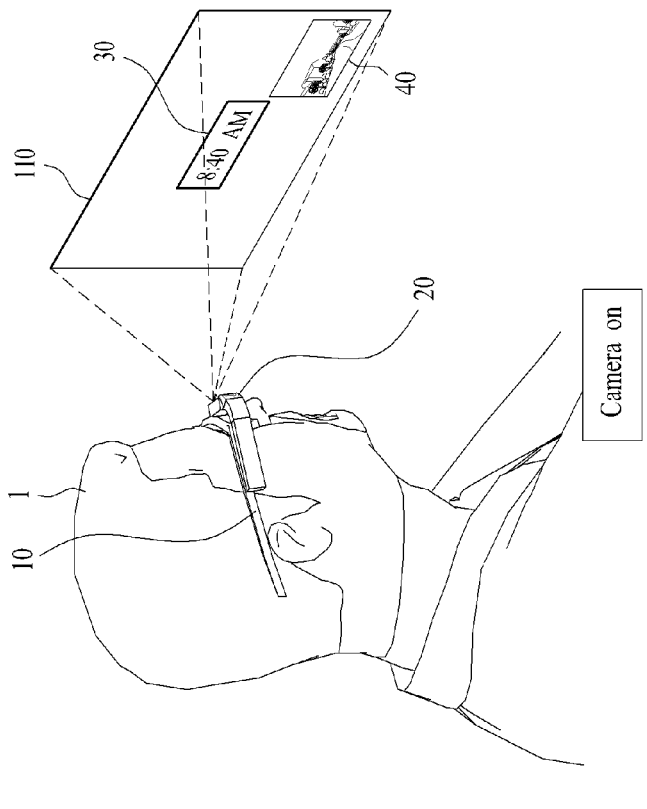
Figure 5B:
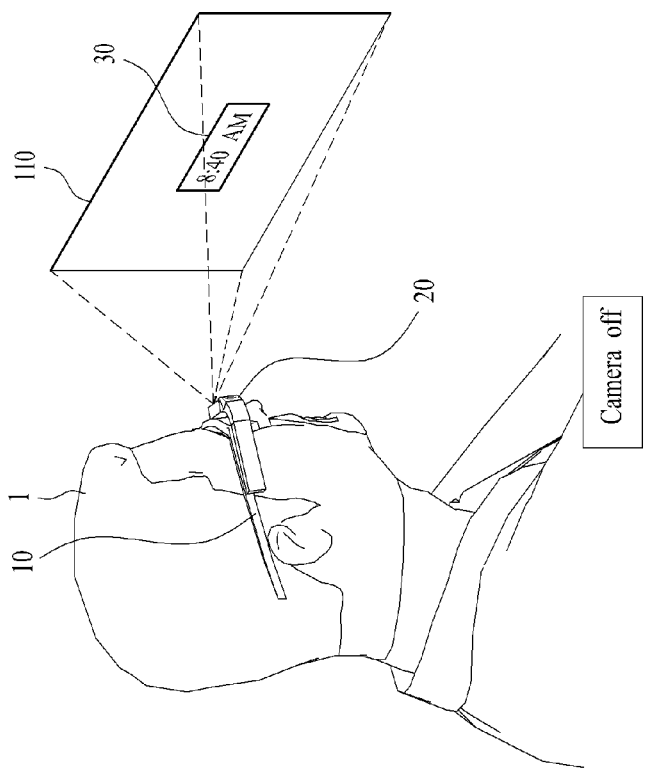

FIG. 5 is a view illustrating a third embodiment of a method of controlling the HMD of this specification. More specifically, FIG. 5a illustrates re-mounting the second body 20 detached from the first body 10 of the HMD 100 to the first body 10. FIG. 5b illustrates content displayed on the display unit 110 when the second body 20 is re-mounted to the first body 10.

As shown in FIG. 5a, the HMD 100 may detect re-mounting of the second body 20 when the second body 20 having detached from the first body 10 is re-mounted to the first body 10. More specifically, the HMD 100 may detect a signal for re-mounting of the second body 20 to the first body 10. The re-mounting signal corresponds to a signal indicating that the second body 20 detached from the first body 10 has been re-mounted to the first body 10.

In addition, as shown in FIG. 5b, when the second body 20 is re-mounted to the first body 10, the HMD 100 may display the first content 30 or second content depending upon whether or not the camera unit is activated.

In one embodiment, in the case that the camera unit is in the deactivated mode as shown on the left side of FIG. 5b, the HMD 100 may display the first content on the display unit 110. Herein, the first content may correspond, as described above with reference to FIG. 3, to the home screen or the content that is currently in use. That is, with the second body 20 detached from the first body 10, the HMD 100 may first display the image preview interface. Then, when the second body 20 is re-mounted to the first body 10 and the camera unit is in the deactivated mode, the HMD 100 may display the first content on the display unit 110, as in the embodiment of FIG. 3. This is because the HMD 100 cannot display an image sensed through the camera unit when the camera unit is in the deactivated mode.

In another embodiment, in the case that the camera unit is in the activated mode as shown on the right side of FIG. 5b, the HMD 100 may display the second content on the display unit 110. Herein, the second content may correspond to an image preview interface of an image sensed through the camera unit, as described above with reference to FIG. 4. That is, with the second body 20 detached from the first body 10, the HMD 100 may first display an image preview interface. When the second body 20 is re-mounted to the first body 10 and the camera unit is in the activated mode, the HMD 100 may display the second content on the display unit 110, as in the embodiment of FIG. 4. This is because the user 1 may desire to keep viewing the image preview interface through the HMD 100 when the camera unit is in the activated mode with the camera unit re-mounted.

In addition, as shown on the right side of FIG. 5b, the HMD 100 may display the first content 30 and the second content 40 simultaneously. This is intended to allow the user 1 to use the existing content even when the image preview interface is displayed. Although not shown in FIGS. 5a and 5b, the HMD 100 may display the mounted-mode indicator in the case that the second body 20 is re-mounted to the first body 10, as in the case of FIG. 3(b).

Although not shown in FIG. 5, in the case that the second body 20 is re-mounted to the first body 10, the HMD 100 may display a third content on the display unit 110. Herein, the third content may correspond to the last captured image among the captured images. That is, the HMD 100 may capture a plurality of images while the second body 20 is detached from the first body 10. When the second body 20 is re-mounted to the first body 10, the HMD 100 may display the last captured image on the display unit 110 among the captured images. Thereby, the user 1 may confirm images captured through the camera unit with the second body 20 detached from the first body 10.

Figure 6:
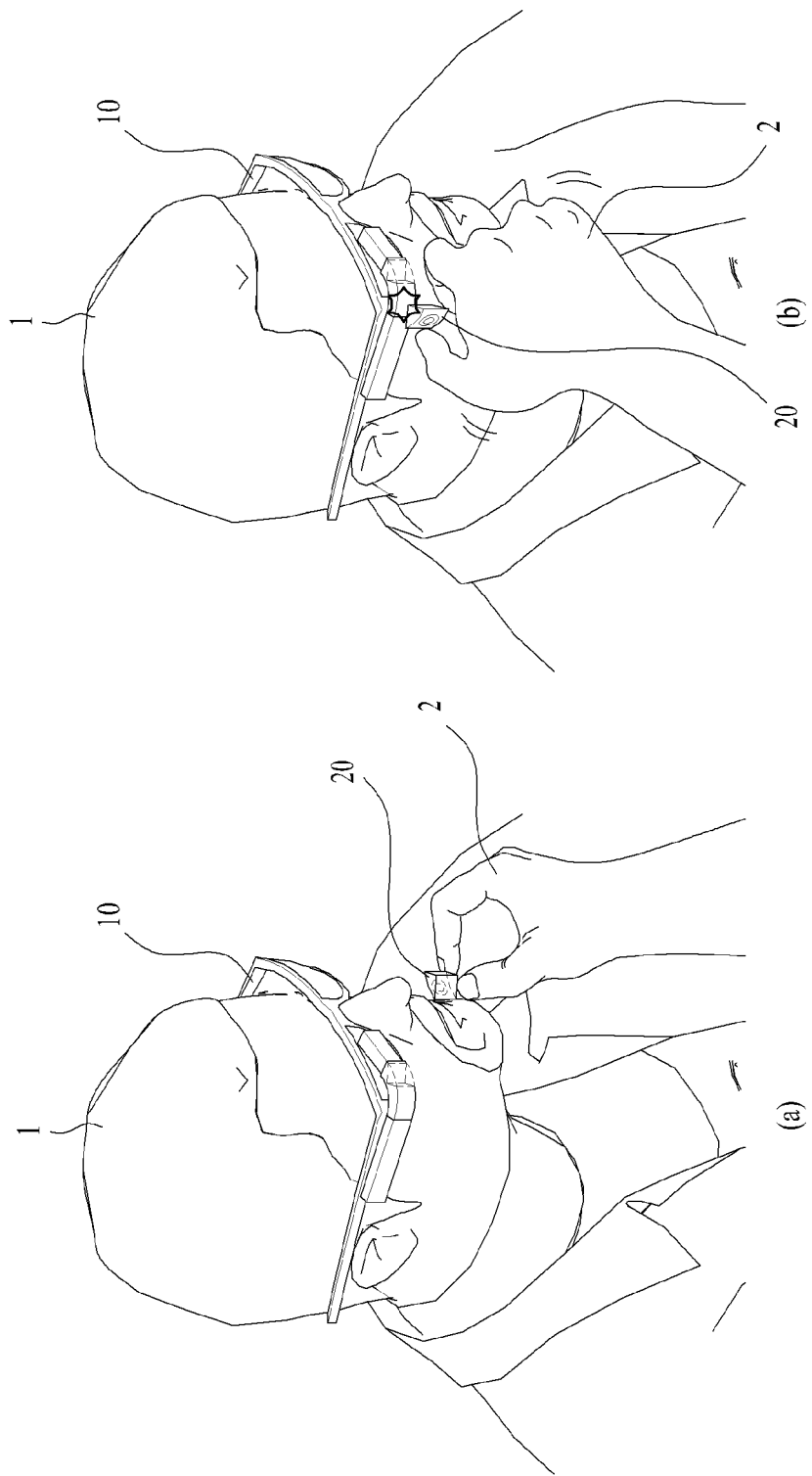
FIG. 6 is a view illustrating a first embodiment of a mounting interface of the HMD of this specification.

FIG. 6 is a view illustrating a first embodiment of a mounting interface of the HMD of this specification. More specifically, FIGS. 6(a) and 6(b) illustrate conditions for activation of the mounting interface when the second body 20 is mounted to the first body 10.

The mounting interface corresponds to an interface to guide movement of the second body 20 when the second body 20 detached from the first body 10 is mounted back to the first body 10. In addition, the mounting interface may be displayed on the display unit 110 to guide the user such that the user can easily mount the second body 20 to the first body 10. In addition, the mounting interface may be provided to the user 1 in various ways. For example, the mounting interface may be provided to the user by being displayed on the display unit, or may be provided to the user as an audio effect through an audio unit.

Referring to FIG. 6(a), when the camera unit included in the second body 20 faces the first body 10, the HMD 100 may display the mounting interface. Herein, the HMD 100 may recognize the camera unit included in the second body 20 facing the first body 10 through the state of display of an image sensed through the camera unit on the display unit. In addition, in the case that at least one portion of the first body 10 is sensed by the camera unit, the HMD 100 may display the mounting interface. For example, in the case that the camera unit included in the second body 20 senses a portion of the first body 10 that is connected to the second body 20, the HMD 100 may display the mounting interface.

Referring to FIG. 6(b), when contact between the first body 10 and the second body 20 occurs, the HMD 100 may display the mounting interface. More specifically, when the sensor unit provided to the first body 10 or the second body 20 recognizes occurrence of contact between the first body 10 and the second body 20, the HMD 100 may display the mounting interface. For example, when contact between a predetermined portion of the first body 10 and a predetermined portion of the second body 20 occurs, the HMD 100 may display the mounting interface. Herein, the predetermined portion of the first body 10 may correspond to a portion of the first body 10 to which the second body 20 is separably mounted. In addition, the predetermined portion of the second body 20 may correspond to a surface of the second body 20 opposite to the surface of the second body 20 to which the camera unit is provided, as shown in FIG. 6(b). In addition, for example, when contact with a portion of the first body 10 and a portion of the second body 20 occurs, the HMD 100 may display the mounting interface.

Although not shown in FIG. 6, in the case that the second body 20 is located within a predetermined range of distance from the first body 10, the HMD 100 may display the mounting interface. In addition, the HMD 100 may display the mounting interface in the case that the camera unit faces the first body 10, and the second body 20 is located within a predetermined range of distance from the first body 10. The HMD 100 may display the mounting interface when various conditions set between the first body 10 and the second body 20 are satisfied.

Figure 7:
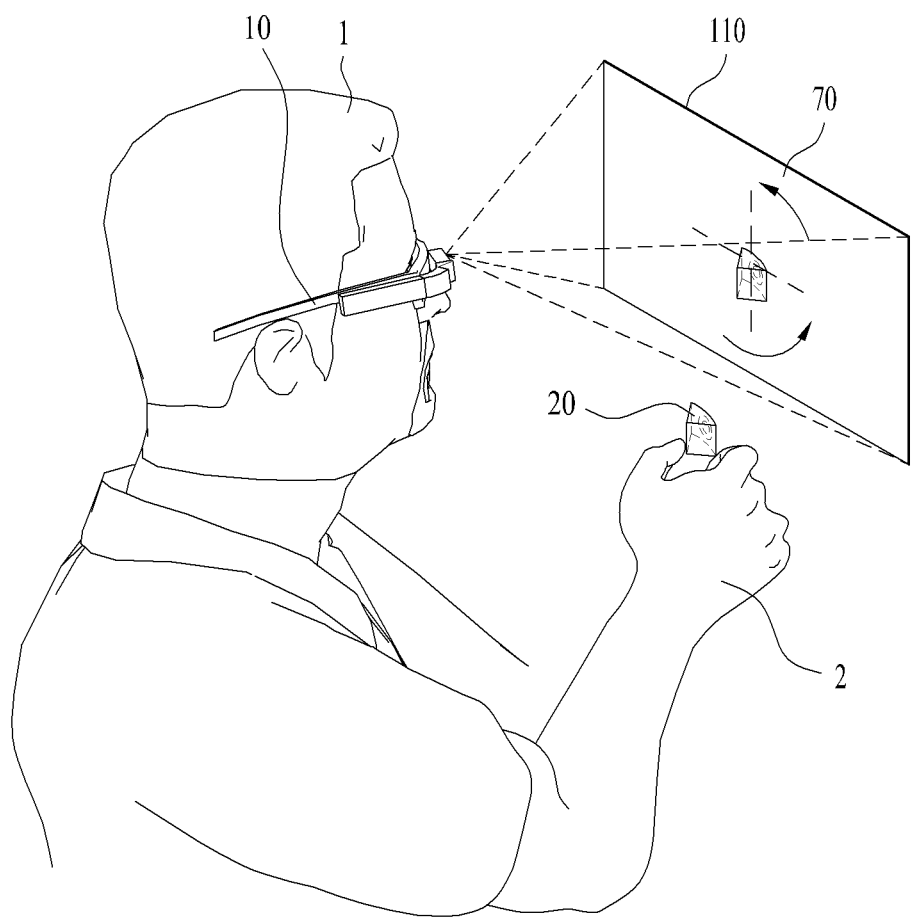
FIG. 7 is a view illustrating a second embodiment of the mounting interface for the HMD of this specification.

FIG. 7 is a view illustrating a second embodiment of the mounting interface for the HMD of this specification. More specifically, FIG. 7 illustrates a case in which the user 1 mounts the second body 20 to the first body 10 through the mounting interface displayed on the display unit.

First, as described above with reference to FIG. 6, the HMD 100 may activate the mounting interface. Then, the HMD 100 may display the mounting interface 60 on the display unit 110 to guide the user 1 in mounting the second body 20 to the first body 10. In the embodiment illustrated in FIG. 7, the HMD 100 may display an augmented reality (AR) mounting guide. The mounting interface may be displayed on the display unit and provided through a graphic effect, as shown in FIG. 7. In addition, the mounting interface may be provided through an audio effect. Thereby, the HMD 100 may guide the user 1 to readily mount the second body 20 to the first body 10.

Referring to FIG. 7, the HMD 100 may display the second body 20 held by the hand 2 of the user on the mounting interface 50. More specifically, the HMD 100 may recognize the position and orientation of the detached second body 20 and display the recognized second body 20 on the mounting interface 50. For example, the HMD 100 may recognize the position and orientation of the second body 20 through a camera unit separately provided to the first body 10. In addition, for example, the HMD 100 may recognize the position and orientation of the second body 20 through the sensor unit provided to the first body 10 or the second body 20.

In addition, when the detached second body 20 is displayed, the HMD 100 may display at least one of the direction and distance for mounting of the second body 20 to the first body 10 on the mounting interface 50. For example, as shown in FIG. 7, the HMD 100 may display, on the mounting interface 50, an arrow indicating the direction in which the second body 20 needs to rotate to be mounted to the first body 10. Thereby, the user 1 may adjust the orientation and distance of the second body 20, mounting the second body 20 to the first body 10.

Figure 8:
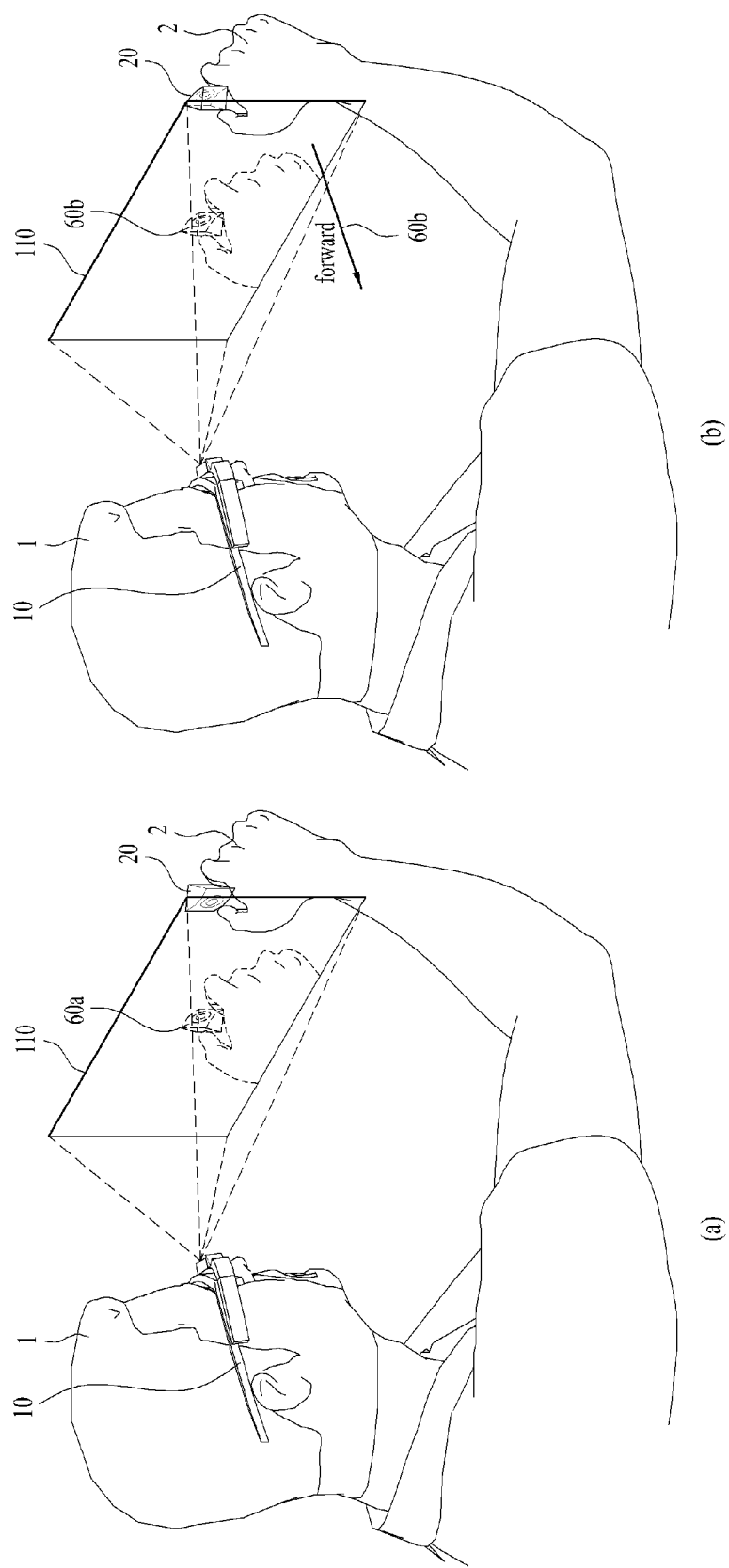
FIG. 8 is a view illustrating a third embodiment of the mounting interface for the HMD of this specification.

FIG. 8 is a view illustrating a third embodiment of the mounting interface for the HMD of this specification. More specifically, FIGS. 8(a) and 8(b) illustrate a case in which the user 1 mounts the second body 20 to the first body 10 through the mounting interface 50 displayed on the display unit.

The HMD 100 may display the mounting interface 60 on the display unit 110 to guide the user 1 to mount the second body 20 to the first body 10. In the embodiment illustrated in FIG. 8, the HMD 100 may display an augmented reality (AR) mounting guide.

Referring to FIG. 8(a), the HMD 100 may display a first AR mounting guide 60a for the hand of the user on the mounting interface. The first AR mounting guide 60a may display a virtual shape of the hand of the user on the display unit 110. In addition, the first AR mounting guide 60a may correspond to an AR image in which the position and direction of the hand 2 of the user 1 and the position and direction of the second body 20 are displayed to facilitate mounting of the second body 20 to the first body 10. For example, referring to FIG. 8(a), the camera unit included in the second body 20 is oriented toward the user 1. However, for the second body 20 to be mounted to the first body 10, the second body 20 needs to be oriented in the direction opposite to the current orientation of the second body 20. Accordingly, the HMD 100 may display the first AR mounting guide 60a on the display unit 110 and guide the user to change the orientation of the camera such that the second body 20 is easily mounted to the first body 10.

Next, referring to FIG. 8(b), the HMD 100 may display, on the mounting interface, a second AR mounting guide 60b for the guide for mounting of the second body 20 to the first body 10. In the case that the shapes of the hand 2 of the user 1 and the second body 20 displayed on the first AR mounting guide 60a are almost the same as the actual shapes thereof, the second AR mounting guide 60b may correspond to an image indicating the direction in which the hand 2 of the user 1 moves. That is, as shown in FIG. 8(b), the second AR mounting guide 60b may guide forward movement of the hand 2 of the user 1 and the second body 20. Thereby, the user 1 may easily mount the second body 20 to the first body 10.

Figure 9:
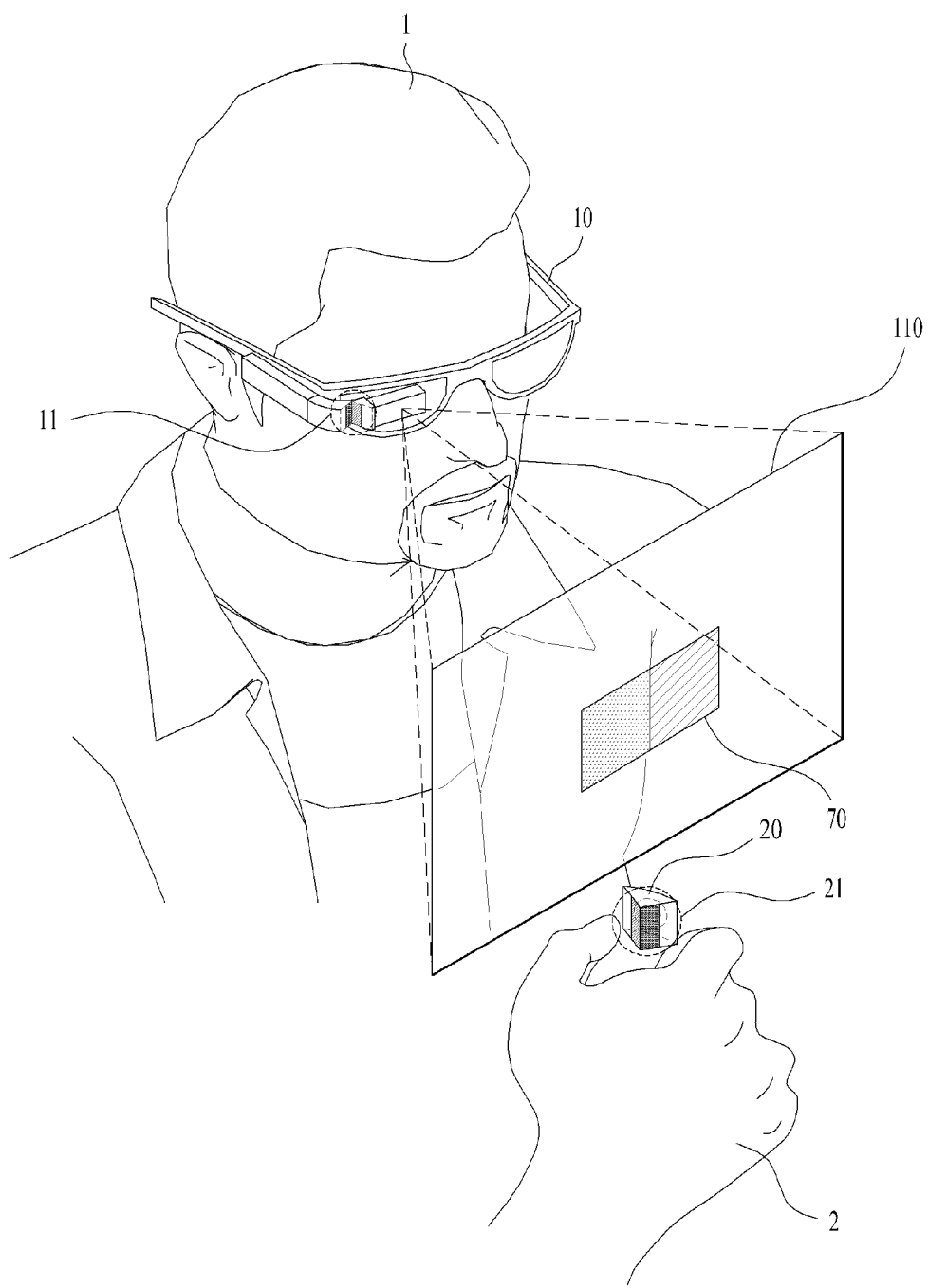
FIG. 9 is a view illustrating a fourth embodiment of the mounting interface for the HMD of this specification.

FIG. 9 is a view illustrating a fourth embodiment of the mounting interface for the HMD of this specification. More specifically, FIG. 9 illustrates recognizing a predetermined pattern of the first body 10 through the camera unit included in the second body 20 to mount the second body 20 to the first body 10.

First, when a predetermined pattern presented on a connection part 11 of the first body 10 is recognized through the camera unit of the second body 20, the HMD 100 may activate the mounting interface. In mounting the second body 20 to the first body 10, the predetermined pattern may indicate the orientation and shape of the second body 20 in mounting. In the embodiment illustrated in FIG. 9, the mounting interface 70 may be an interface to guide movement direction and movement distance of the second body 20 such that the direction of the predetermined pattern presented on the connection part 11 of the first body 10 coincides with the direction of a predetermined pattern presented on a connection part 21 of the second body 20.

By displaying the mounting interface 70 on the display unit 110, the HMD 100 may guide the second body 20 such that the shape of the predetermined pattern on the connection part 21 of the second body 20 coincides with the predetermined pattern appearing on the mounting interface 70. Thereby, the user 1 may move the hand 2 holding the second body 20 to make the shape of the predetermined pattern on the connection part 21 of the second body 20 identical to the predetermined pattern appearing on the mounting interface 70.

Although not shown in FIG. 9, in the case that the predetermined pattern on the connection part 21 of the second body 20 is recognized as being identical to the predetermined pattern of the mounting interface 70, the HMD 100 may guide mounting of the second body 20 to the first body 10 with the orientation of the second body 20 maintained. For example, the HMD 100 may provide the movement direction and movement distance of the second body 20 to the user 1 through a graphic effect on the mounting interface 70. In addition, for example, the HMD 100 may provide the movement direction and movement distance of the second body 20 to the user 1 through an audio effect.

Figure 10:
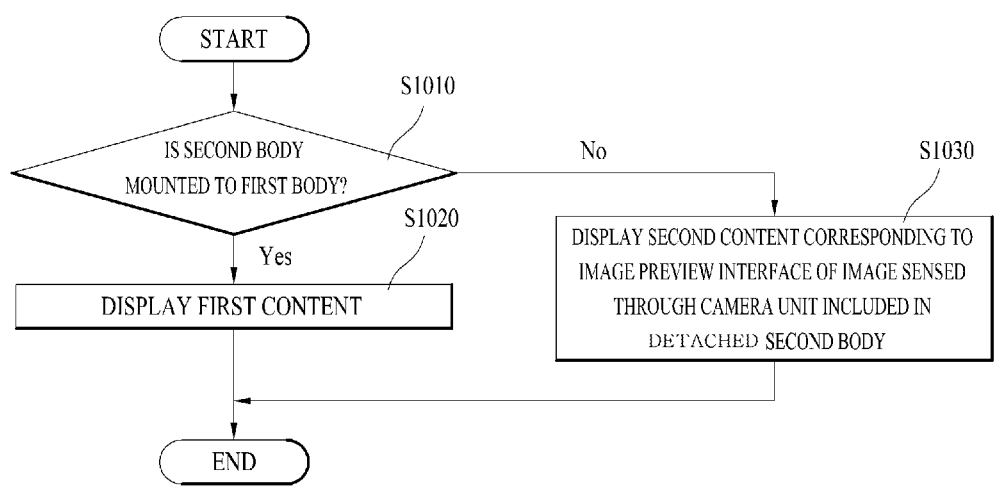
FIG. 10 is a flowchart illustrating a method of controlling the HMD of this specification.

FIG. 10 is a flowchart illustrating a method of controlling the HMD of this specification.

First, the HMD may determine whether the second body is mounted to the first body (S1010). That is, the HMD is configured with the first body and the second body, and the second body may be mounted to and detached from the first body, which serves as the main body. The HMD may determine whether the second body is mounted to the first body through a sensor unit provided to the first body or the second body.

In step S1010, in the case that the second body is mounted to the first body, the HMD may display a first content (S1020). More specifically, the HMD may detect a signal for mounting of the second body to the first body. The first content may correspond, for example, to the home screen or the content that is currently in use.

In step S1010, in the case that the second body is not mounted to the first body, the HMD display a second content corresponding to an image preview interface of an image sensed through a camera unit included in the detached second body (S1030).

Further, while embodiments have been described with reference to each of the drawings, a new embodiment may be implemented by combining the embodiments illustrated in the drawings. In addition, designing a recording medium readable by a computer having a recorded program for implementation of the previously described embodiments according to necessity of those skilled in the art is also within the scope of this specification.

The configurations and methods according to the above-described embodiments will not be applicable in a limited way to the foregoing HMD and method of controlling the same, and all or parts of the embodiments may be selectively combined and configured to make various modifications thereto.

Meanwhile, a method of controlling the HMD may be implemented on a recording medium readable by a processor provided to a network device as codes readable by a processor. The recording media readable by the processor include all kinks of recording devices that store data readable by the processor. Examples of the recording media readable by the processor may include ROM, RAM, CD-ROM, magnetic tape, floppy disk, and optical data storage device, and may also include a device implemented in the form of a carrier wave such as, for example, transmission via the Internet. In addition, the recording media readable by the processor may be distributed in computer systems connected to each other over a network, and thus codes readable by the processor may be stored and executed in a distributed manner.

As is apparent from the above description, the present invention has effects as follows.

According to one embodiment, when detachment of a camera from a head-mounted display (HMD) is detected, the HMD may readily provide the user with an image preview interface of an image sensed through the camera.

According to another embodiment, in the case that the camera detached from the HMD is re-mounted, the HMD may provide the image preview interface even with the camera re-mounted, depending upon whether the camera is activated.

According to another embodiment, when the camera detached from the HMD is re-mounted, the HMD may display a mounting interface under various conditions to guide the user such that the user can easily mount the camera.

According to another embodiment, when the camera detached from the HMD is re-mounted, the HMD may display various mounting interfaces on a display unit to guide the user such that the user can easily mount the camera.

Although preferred embodiments have been shown and described, this specification is not limited to the above embodiments. It will be apparent to those skilled in the art that various modifications and variations can be made in this specification without departing from the spirit or scope of this specification. Thus, it is intended that the present invention cover the modifications and variations of this invention provided they come within the scope of the appended claims and their equivalents. These variations should not be individually construed from the technical spirit or prospect of this specification.

In this specification, both a product and a method have been described as the invention. Descriptions thereof are supplementarily applicable, when necessary.

What is claimed is:

1. A head-mounted display (HMD) comprising a first body and a second body, wherein:
    the first body comprises:
        a display unit configured to display visual information;
        a first communication unit configured to transmit/receive data; and
        a processor configured to control the display unit, a sensor unit, a camera unit, the first communication unit, and a second communication unit; and
    the second body comprises:
        the camera unit configured to sense an image;
        the second communication unit configured to transmit/receive data; and
        the sensor unit configured to detect an input signal and transmit a result of the detection to the processor,
    wherein the second body is detachable from and mountable to the first body,
    wherein the processor is further configured to:
        display a first content when the second body is mounted to the first body; detect a signal when the second body is detached from the first body; and display a second content in response to the detected signal indicating detachment of the second body, wherein the second content corresponds to an image preview interface of an image sensed through the camera unit included in the detached second body, wherein the processor is further configured to display a mounted-mode indicator when the second body is mounted to the first body, and wherein, when the second body is re-mounted to the first body after being detached from the first body, the processor is further configured to:

display the second content if the camera unit is in an activated mode, and display the first content if the camera unit is in a deactivated mode.

2. The HMD according to claim 1, wherein the processor is further configured to display a mounting interface when the second body is mounted to the first body.

3. The HMD according to claim 2, wherein the mounting interface is displayed when the camera unit faces the first body.

4. The HMD according to claim 2, wherein the mounting interface is displayed when contact between the first body and the second body occurs.

5. The HMD according to claim 2, wherein the mounting interface is displayed when the second body is within a range of a predetermined distance from the first body.

6. The HMD according to claim 2, wherein the mounting interface is displayed when a predetermined pattern of a connection part of the first body is recognized within an area of view angle of the camera unit included in the second body.

7. The HMD according to claim 2, wherein the mounting interface displays at least one of a direction and a distance of the second body for mounting the second body to the first body.

8. The HMD according to claim 2, wherein the mounting interface displays an augmented reality (AR) mounting guide.

9. The HMD according to claim 2, wherein the processor is further configured to:

display a first guide image representing a virtual hand shape, and display a second guide image configured to display at least one of a moving direction and a moving distance of a hand of a user when the hand of the user coincides with the first guide image.

10. The HMD according to claim 1, wherein the processor is further configured to display a detached-mode indicator when the second body is detached from the first body.

11. The HMD according to claim 1, wherein the HMD is worn by a user.

12. A method of controlling a head-mounted display including a first body and a second body, wherein:

the first body comprises:

a display unit configured to display visual information;

a first communication unit configured to transmit/receive data; and a processor configured to control the display unit, a sensor unit, a camera unit, the first communication unit, and a second communication unit; and the second body comprises:

the camera unit configured to sense an image;

the second communication unit configured to transmit/receive data; and the sensor unit configured to detect an input signal and transmit a result of the detection to the processor, the method comprising:

displaying a first content when the second body is mounted to the first body, wherein the second body is mountable to and detachable from the first body;

detecting a signal when the second body is detached from the first body;

displaying a second content in response to the detected signal indicating detachment of the second body, wherein the second content corresponds to an image preview interface of an image sensed through the camera unit included in the detached second body; and displaying a mounted-mode indicator when the second body is mounted to the first body, wherein, when the second body is re-mounted to the first body after being detached from the first body, the method further comprises:

displaying the second content if the camera unit is in an activated mode, and displaying the first content if the camera unit is in a deactivated mode.

13. The method of claim 12, wherein the method further comprises:

displaying a mounting interface when the second body is mounted to the first body.

14. The method of claim 12, wherein the method further comprises:

displaying a detached-mode indicator when the second body is detached from the first body.

* * * * *